Feb. 3, 1948.  R. R. CANDOR  2,435,530
CONTROL FOR ELECTRIC OVENS
Filed Sept. 21, 1940  2 Sheets-Sheet 1

INVENTOR.
ROBERT R. CANDOR,
BY
ATTORNEYS

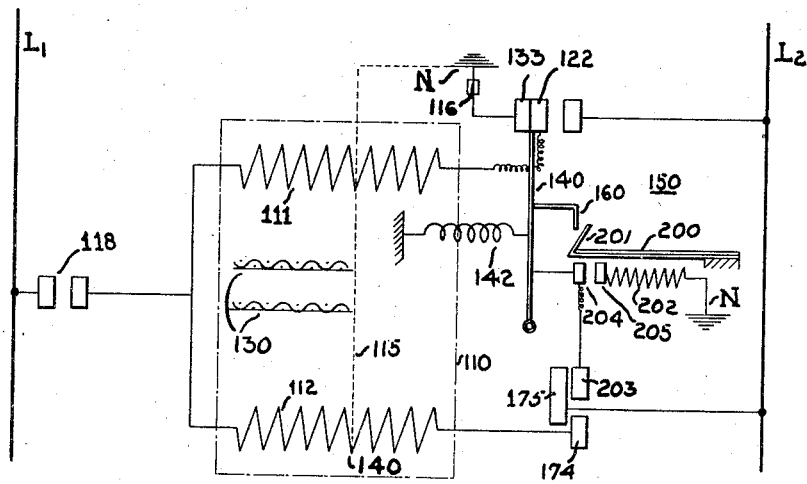
Fig. 5
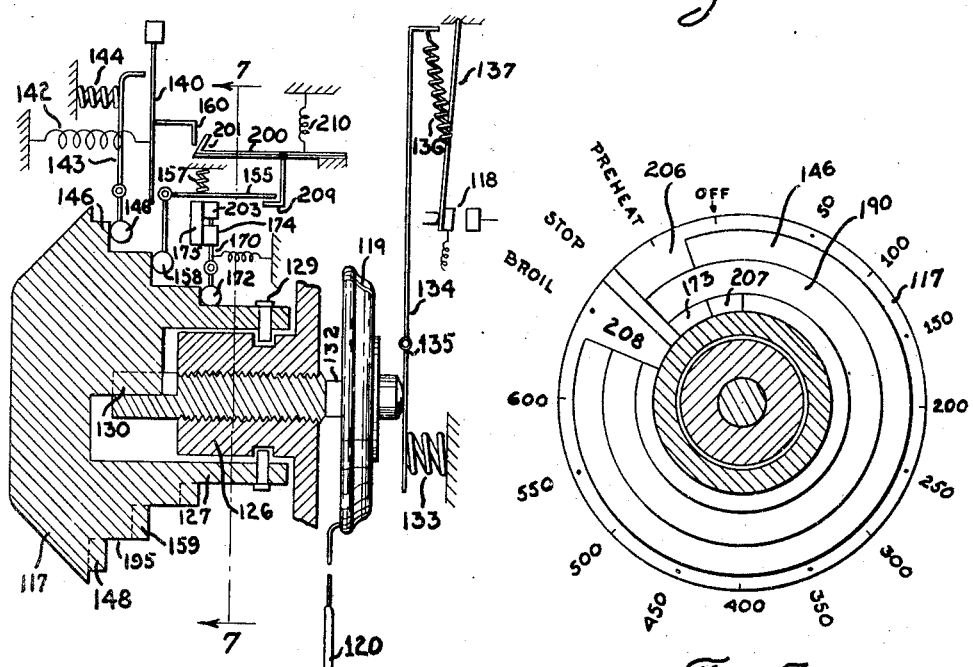
Fig. 6
Fig. 7

Patented Feb. 3, 1948

2,435,530

UNITED STATES PATENT OFFICE 2,435,530

CONTROL FOR ELECTRIC OVENS

Robert R. Candor, Oakwood, Ohio, assignor to General Motors Corporation, Dayton, Ohio, a corporation of Delaware Application September 21, 1940, Serial No. 357,786

4 Claims. (Cl. 219—20)

This invention relates to domestic appliances and more particularly to electric ranges.

An object of this invention is to provide an electric range system in which a preheating operation at a relatively high wattage is controlled by a timing mechanism followed by operation at a lower wattage controlled by a thermostat, the timing mechanism and the adjustment of the thermostat being controlled by a single manipulator.

Further objects and advantages of the present invention will be apparent from the following description, reference being had to the accompanying drawings, wherein a preferred form of the present invention is clearly shown.

In the drawings:

Fig. 5 is a view similar to Fig. 1, but showing the modification thereof;

Fig. 6 is a view similar to Fig. 2, but showing modification thereof; and

Fig. 7 is a view taken along the lines 7—7 of Fig. 6.

Figure 1:
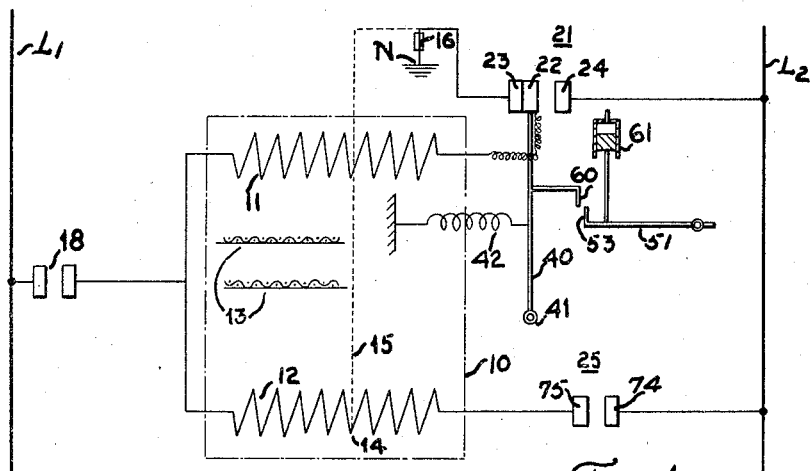
Fig. 1 is a diagrammatic showing of a wiring arrangement for the range together with controls therefor.

An electric range embodying my invention may include an oven 10 provided with an upper resistance 11, used primarily for broiling purposes, and a lower resistance 12 used primarily for baking purposes, together with shelving provisions 13 intermediate the resistances 11 and 12 to support foods between the resistances. The resistances 11 and 12 are adapted to be connected to an electrical source of power such as lines L—1, L—2, and, if desired, certain connections to a neutral or grounded line N may be provided. Preferably the arrangement is such that the resistances 11 and 12 are energized at full wattage for the preheating operation by being placed across the lines L—1 and L—2. The baking operation preferably is performed by energizing the lower resistance 12 at full wattage across the full voltage of lines L—1 and L—2 together with the upper resistance 11 at reduced wattage, such as by placing it across the lines L—1 and N, or by placing it across the line L—1 to an intermediate point 14 of heater 12 through the medium of lines 15. If desired an external resistance 16 may be interposed between the upper heater 11 and the neutral line N. For broiling operations the upper heater 11 alone may be energized at full wattage by being placed across the lines L—1 and L—2.

A controller for accomplishing the foregoing is provided, which has a single manipulator 17, preferably in the form of a dial. A first switch 18 is operated by a thermostatic element 19 under the influence of thermostatic bulb 20 within the oven 10. A second switch 21 is actuated by the manipulator 17 so that its movable contact 22 may be close with either contact 23 or contact 24. When contact is made at 23, the upper resistance 11 is placed across L—1 and N, or across L—1 and 14. When contact is made at 24, upper resistance 11 is placed across L—1 and L—2. A third switch 25 is operated by the manipulator 17 and is opened in its "broil" and "off" position.

The thermostatic element 19, and its control over switch 18 is adjustable by the manipulator 17. This is accomplished by mounting the manipulator 17 rotatably about the stationary hub 26, the outer sleeve 27 of the manipulator bearing on the external surface 28 of the hub 26, and being axially keyed at 29. A sliding key 30 is keyed into a screw 31 which bears against the center 32 of the thermostatic bellows or diaphragm 19. The screw 31 is axially fixed to the bellows 19, but may rotate relatively thereto. The bellows 19 is held in position by axially sliding bearings, not shown, and by the action of spring 33, which maintains the center 32 of the bellows against the end of the screw 31. When the bellows expands or contracts, it moves the lever 34 about the fulcrum 35 and operates the snap switch 18 through the medium of spring 36, which is secured at one end to the lever 34 and at the other end to a fulcrumed lever 37. When the bellows 19 contracts sufficiently, by the cooling of the oven, it closes the switch 18, whereas expansion of the bellows, by the heating of the oven, opens the switch 18. The setting of the bellows 19 is such that in the "off" position, even when fully collapsed, the switch 18 cannot close. By this construction, the thermostatic element or bellows 19 can cycle the resistances 11 and 12 in response to oven temperatures, and the setting of the thermostat can be adjusted to various temperatures by rotation of the manipulator 17.

The switch 21 is operated by the manipulator 17. The movable contact 22 is mounted on lever 40 fulcrumed at 41 and normally urged to the left by the tension spring 42. A lever 43 is adapted to move the contact 22 against contact 24. This is accomplished by a compression spring 44 which normally tends to rotate the lever 43 clockwise about the fulcrum 45, but is prevented from doing so by the cam 46 of the manipulator 17. The cam 46 engages the end 47 of the rod 43 in every position of the manipulator except the "broil" position and the "preheat" position, where a recess 48 is provided in the cam 46 as is evident from Fig. 3. On the "broil" or "preheat" positions, the end 47 can move into the recess 48, and when this occurs the lever 43, under the power of spring 44 moves lever 40 and its contact 22 against contact 24. By this construction, the upper resistance 11 is energized at full wattage across the lines L—1 and L—2 in the "broil" and "preheat" positions of the manipulator 17; whereas the heater 11 is placed across the lines L—1 and N or point 14 at every other position of the manipulator 17.

A clock control 50 is provided, which is actuated by the manipulator 17 and holds the contact 22 on contact 24 for a predetermined period of time after the manipulator 17 has been moved to and away from the "preheat" position. This is accomplished by providing a hook lever 51, fulcrumed at 52, the hook 53 of which is normally urged downward by the tension spring 54. The lever 55, fulcrumed at 56 is adapted to move the hook 53 upwardly under the power of spring 57 whenever the end 58 falls into recess 59, when the manipulator 17 is on the "preheat" position. The construction is such that when the manipulator is rotated, first through the "broil" position, contact 22 is moved to contact 24 and the hook 60 is moved to the right. Thereafter, upon further rotation of the manipulator 17 to "preheat" position, the hook 53 engages hook 60 and prevents movement of contact 22 away from contact 24 until after a predetermined length of time, determined by a clock mechanism, which, in Fig. 2, may take the form of dash-pot 61, while in Fig. 4 it may take the form of gear train 63 and escapement 64. With the above construction the hook 53 is in its lower position at all positions of the manipulator 17 except in the "preheat" position. Movement of the manipulator 17 to and away from "preheat" sets the switch 21 with contact 22 on 24 for a predetermined period of time controlled by the clock mechanism 50.

Figures 2, 3, 4:
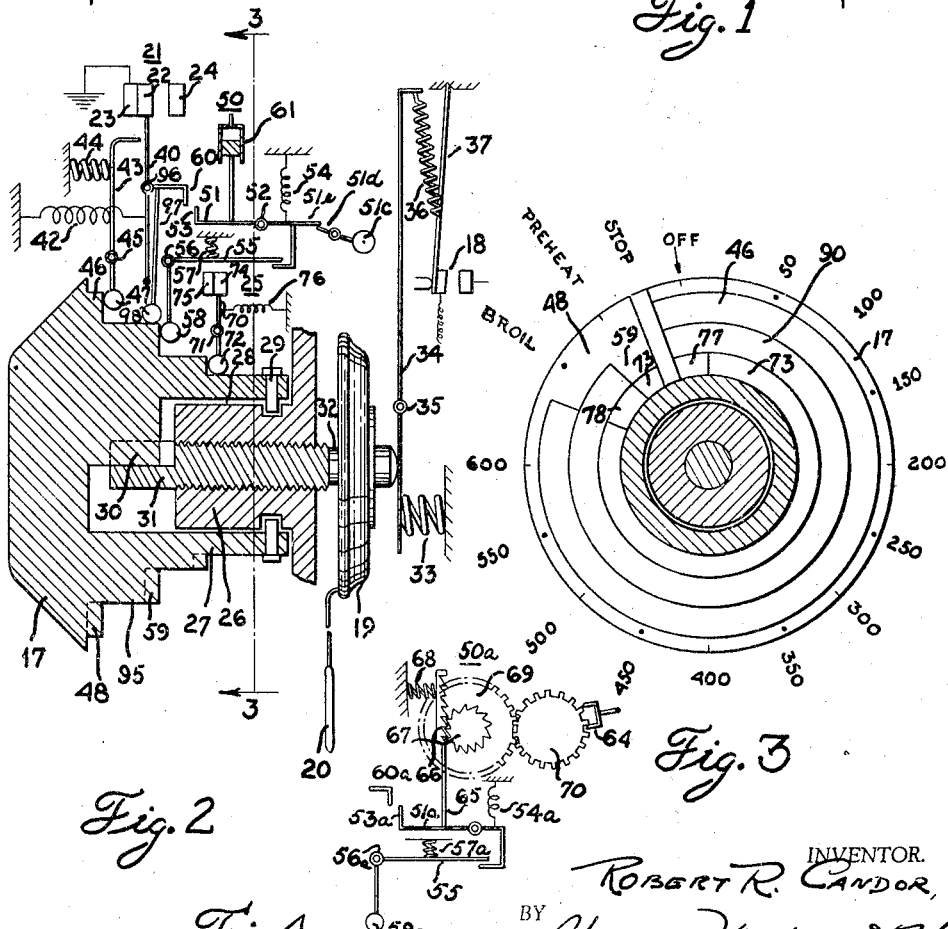
Fig. 2 is a diagrammatic showing of the controller itself.
Fig. 3 is a view taken along the line 3—3 of Fig. 2, together with indications which may be placed on the front side of the dial.
Fig. 4 shows a slightly modified timer which may be applied to Fig. 2.

Movement of the manipulator 17 also energizes the power mechanism of the clock 50, or 50a. The power mechanism of clock 50 is the spring 54, and this is energized by being pulled downwardly when the manipulator 17 is moved to "preheat" position, thus causing end 58 to move into recess 59, and causing spring 57 to energize spring 54. In Fig. 4, the spring 54a is likewise energized by movement of the corresponding manipulator. With regard to Fig. 4, it is understood that the structure shown in Fig. 4 is to be substituted in its obvious position of Fig. 2. The parts which are identical, or correspond to those of Fig. 2 are indicated by the same numeral with a suffix a, while the remainder of Figs. 1, 2 and 3 are to be the same with respect to Fig. 4. The lever 51a is provided with a rod 65 which is provided with a one-way pinion 66 engaging wheel 67. The construction is such that the rod 65 may move freely upwardly without rotating the wheel 67, whereas it must rotate the wheel in downward movement. A compression spring 68 is provided for holding the pinion 66 and wheel 67 together. The wheel 67 is fixed to a larger gear wheel 69 which in turn meshes with the gear 70 provided with the escapement 64. The arrangement of Fig. 4 is such that when the manipulator 17 is moved to and away from "preheat," the lever 55 moves downwardly and energizes the spring 54a and hooks the pinion 66. Thereafter a timing operation is initiated by the slow downward movement of the rod 65 under the control of the escapement 64 and under the power of spring 54a.

The switch 25 is operated by the manipulator 17, so that it remains closed in all positions except the "off" and "broil" positions. This is accomplished by providing a lever 70 fulcrumed at 71, with its lower end 72 bearing against the cam surface 73. The upper end of the lever 70 carries the movable contact 74, and is normally urged away from the stationary contact 75 by a tension spring 76. As long as the lower end 72 of the lever 70 rides on the cam 73 the switch 25 is closed, and this occurs in all positions of the manipulator 17 except on the "off" position and the "broil" position. Recesses 77 and 78 are provided in the cam 73, and when the end 72 enters these recesses, the switch 25 is opened.

As a consequence of the above, the heaters 11 and 12 are completely deenergized when the manipulator is in the "off" position. This is accomplished because, in this position, the switch 18 is opened by the adjustment of the thermostat 19, the switch 25 is opened by the rod 70, while the switch 21 is in a position where the contact 22 engages contact 23 and thus connects one end of the resistance 11 to the neutral line or to the deenergized point 14 of the lower unit 12. When the manipulator 17 is in any one of the temperature graduated positions such as from 50 to 600, the lower unit 12 operates at full wattage across the lines L—1 and L—2 while the upper unit operates at a reduced wattage across the line L—1 to the neutral N or to the point 14. At this time the heaters 11 and 12 are cycled at the selected oven temperature under the control of the thermostat 19 in response to oven temperatures by the opening and closing of the switch 18. When the manipulator is moved to the "broil" position, the upper heater 11 is energized at full wattage across the lines L—1 and L—2 by reason of the fact that the contact 22 engages contact 24 and the switch 18 is maintained closed by the thermostat 19 at all ordinary "broil" temperatures in the oven 10. Usually the average temperature of the oven 10 is insured to be below the 600° setting by slightly opening the door of the oven during broiling operations, and as a consequence the heater 11 continues to operate in a glowing condition without interruption due to thermostatic control stopping only under abnormally high temperature conditions above 600°. When it is desired to preheat the oven quickly prior to a baking operation, the manipulator 17 is moved to the "preheat" position and then moved to a selected bake temperature setting between the 50 and 600 graduations. Following this manipulation, the heaters 11 and 12 are energized at full wattage because the switch 18 is closed by the thermostat 19 and because the contact 22 is in engagement with the contact 24 and is locked in that position by the hook 53 under the control of the clock mechanism 50. The heaters continue to be energized at full wattage for a predetermined period of time, determined by the setting of the clock mechanism, after which time the clock mechanism lowers the hook 53 and releases the lever 40, allowing it to move to the left under the tension of spring 42 thus bringing contact 22 into engagement with contact 23. As a result, after the oven has been preheated under control of the clock mechanism, the heaters 11 and 12 are cycled under the control of thermostat 19 and the upper heater at reduced wattage. It is to be noted that the oven is not preheated above the selected temperature, because even if the clock mechanism is still holding the contact 22 on contact 24 when the selected temperature is reached in the oven, the thermostat 19 opens the switch 18 at this selected temperature and thus prevents the oven from heating above the selected temperature.

It is understood that the clock mechanism disclosed in this application may be provided with an audible signal such as a bell to be sounded when the clock mechanism releases the switch which it controls and thus informs the user that the preheating operation has terminated. The bell signal may be operated mechanically when the lever 51 reaches its preheat terminating position. The bell 51c may be provided with a trip lever 51d, which is caught by the extension 51e on its downward or clock setting position. When the lever 51 returns to its preheat terminating position, the trip lever 51d is released and the bell is sounded.

In the modification shown in Figs. 5, 6 and 7, the time device is operated by the electric current. In the particular form shown, a thermostatic element is heated during the preheat operation, so that it terminates the preheat operation after a substantially definite length of time during which interval the thermostatic element is being heated by the electric current. In Fig. 5, the elements corresponding to those shown in Fig. 1 have been numbered with the same number except that 100 has been added thereto. For example, the switch 118 of Fig. 5 corresponds to switch 18 of Fig. 1 and is operated by the thermostatic element 119 of Fig. 6 precisely the same way that the switch 18 is operated by the thermostatic element 19 of Fig. 2. All of the elements of Figs. 5, 6 and 7 operate exactly the same as in Figs. 1, 2 and 3 with the exception of the timing mechanism and with the exception that recesses in the manipulator cams are slightly modified to adapt the system to the thermostatic clock control.

The thermostatic clock control 150 includes bimetal thermostatic element 200 provided with a hook 201. When the manipulator 117 is moved to the "preheat" position the lever 140 is moved to the right and is engaged by the hook 201 of the thermostatic element 200, being retained in this position for a predetermined length of time during which the thermostatic element is heated by the heater 202 whereupon the hook 201 is lowered sufficiently to release the hook 160 to allow the lever 140 to be moved to the left by the tension spring 142.

The heater 202 is under the control of the manipulator 117 through the medium of lever 170, which lever 170 carries a second movable contact 203 in addition to the movable contact 174. When the lever 170 is moved counter-clockwise in Fig. 6, the contacts 174 and 203 close upon contact 175. On the "preheat" position, the lever 140 is moved to the right and therefore brings the contact 204 into engagement with the contact 205. This closes a circuit from the line L—2 to ground or neutral N to energize the heater 202.

As a consequence of the above, when the manipulator is moved first to the "preheat" position and then to any one of the "bake" positions between the graduations 50 and 600, the heaters 111 and 112 are first heated at maximum wattage for a predetermined period of time while the thermostatic element 200 is being heated. After the element 200 is heated, the hook 201 releases the hook 160 and allows the heaters 111 and 112 to cycle under the control of thermostat 119 at the selected bake temperature with the upper heater 111 at reduced wattage and the lower heater 112 at maximum wattage.

The heater 200 is normally biased, in its unheated condition to be in its upper position. This may be accomplished by having it inherently remain there in its unheated position as shown in Fig. 5, or it may be aided by the tension spring 210 as shown in Fig. 6, as desired.

The cam surfaces 146, 190 and 173 of Fig. 7 are quite similar to the corresponding cams 46, 90 and 73 of Fig. 3. However, they have been modified in order to insure proper operation of the heater 202. Thus a recess 206 is provided in the cam 146 at "preheat" position. On "preheat" position the cam 190 has no recess because at this time it is desired to maintain the lever 155 in the upper position to allow the hook 201 to engage hook 160. It is noted that the hook 201 is inclined so that the hook 160 may snap over it as the manipulator 117 is brought to "preheat" position. In the "off" position, the cam 173 is provided with a recess 207. This opens the contacts 203, 174 and 175 while the cam 146 causes lever 140 to maintain contacts 122 and 123 in engagement. At this time the switch 118 is opened because of the adjustment of the thermostat 119 below room temperature, and as a consequence the heaters 111 and 112 are deenergized and disconnected from the lines L—1 and L—2. In the "broil" position, a recess 208 is provided in the cams 146, 190 and 173. As a result, the lever 140 is moved to the right by the lever 143 similarly to the action in Figs. 1 and 2. The hook 160 is not engaged by the hook 201 in the "broil" position because at this time the lever 155 is lowered into engagement with the hook 209 of the heater 200 and lowers the heater to prevent engagement of the hooks 160 and 201. As a consequence, when the manipulator 117 is moved away from the "broil" position the lever 140 is allowed to move to the left without engagement of the hook 201 and thus a preheating operation at that time is prevented. Operation of the other parts of the elements shown in Figs. 5, 6 and 7 are believed to be obvious by reference to corresponding operation in Figs. 1, 2 and 3 and hence they are not further described.

If desired, the length of the preheating period may be varied, preferably in accordance with the temperature adjustment selected. The preheating period preferably is made longer as the higher temperature adjustments are selected by the position of the manipulator 17. To accomplish this the surface 95 may be made with gradually varying distance from its axis so that its surface is greater at the places corresponding to the lower temperature selections (50°—) and gradually (or by steps) becomes less at the places corresponding to the higher heat selections (600°—). The hook 60 may be fulcrumed at 96, and may be urged downwardly either by gravity or by spring action, being stopped by the vertically adjustable rod 97. The lower end 98 of the rod 97 rides on the surface 95 so that the vertical position of the hook 60 is varied in accordance with the temperature setting to be higher with the lower temperature settings and vice versa. This adjusts the preheating time by varying the time required for hook 53 to release hook 60.

While the form of embodiment of the invention as herein disclosed constitutes a preferred form, it is to be understood that other forms might be adopted, all coming within the scope of the claims which follow.

What is claimed is as follows:

1. An electric oven including an electric heating means for heating the oven, an adjustable thermostatic switch means for controlling the connection of the heating means to a power source to regulate the temperatures of said oven, connecting means for connecting said heating means selectively into a baking circuit arrangement and into a preheat circuit arrangement, an adjustable clock mechanism for controlling according to definite periods of time the operation of the connecting means in changing from the preheat circuit arrangement to the baking circuit arrangement, manipulating means provided with means for setting said connecting means in the preheat circuit arrangement and with means for adjusting said thermostatic switch means to operate at various temperature settings, and operating means between the switch adjusting means and said clock mechanism for adjusting said clock mechanism in direct accordance with the adjustment of said thermostatic switch means.

2. An electric oven including an electric heating means for heating the oven, an adjustable thermostatic switch means for controlling the connection of the heating means to a power source to regulate the temperatures of said oven, connecting means for connecting said heating means selectively into a baking circuit arrangement and into a preheat circuit arrangement, an adjustable clock mechanism for controlling according to definite periods of time the operation of the connecting means in changing from the preheat circuit arrangement to the baking circuit arrangement, a single manipulating means provided with means for setting said connecting means in the preheat circuit arrangement and with means for adjusting said thermostatic switch means, and operating means between said manipulating means and said clock mechanism for adjusting said clock mechanism in direct accordance with the adjustment of said thermostatic switch means.

3. An electric oven including an electric heating means for heating the oven, an adjustable thermostatic switch means for controlling the connection of the heating means to a power source to regulate the temperatures of said oven, connecting means for connecting said heating means selectively into a baking circuit arrangement and into a preheat circuit arrangement, an adjustable clock mechanism for controlling according to definite periods of time the operation of the connecting means in changing from the preheat circuit arrangement to the baking circuit arrangement, a single manipulating means provided with optional means for setting said connecting means in the preheat circuit arrangement and with means for adjusting said thermostatic switch means, and operating means between the switch adjusting means and said clock mechanism for adjusting the clock mechanism.

4. An electric oven including an electric heating means for heating the oven, an adjustable thermostatic switch means for controlling the connection of the heating means to a power source to regulate the temperatures of said oven, connecting means for connecting said heating means selectively into a baking circuit arrangement and into a preheat circuit arrangement, an adjustable timing mechanism for controlling according to definite periods of time the operation of the connecting means in changing from the preheat circuit arrangement to the baking circuit arrangement, manipulating means provided with means for setting said connecting means in the preheat circuit arrangement and with adjusting means for adjusting said thermostatic switch means to operate at various temperature settings, and cam means operated by said adjusting means and proportioned in accordance with the times required to reach the temperature settings to which the switch means may be adjusted for adjusting said timing mechanism.

ROBERT R. CANDOR.

REFERENCES CITED

The following references are of record in the file of this patent:

UNITED STATES PATENTS

| Number | Name | Date |
| --- | --- | --- |
| 2,148,203 | Jones | Feb. 21, 1939 |
| 2,295,298 | Sharp | Sept. 8, 1942 |
| 2,268,737 | Brown | Jan. 6, 1942 |
| 2,210,947 | Myers et al. | Aug. 13, 1940 |
| 2,224,983 | Parkhurst | Dec. 17, 1940 |
| 2,202,725 | Bear | May 28, 1940 |
| 1,758,619 | Phillips | May 13, 1930 |
| 2,079,618 | Kahn | May 11, 1937 |
| 2,207,870 | Myers | July 16, 1940 |